(12) United States Patent
Bostick et al.

(10) Patent No.: US 9,571,748 B1
(45) Date of Patent: Feb. 14, 2017

(54) CAMERA FLASH LIGHT DIRECTION MANAGEMENT

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/923,863

(22) Filed: Oct. 27, 2015

(51) Int. Cl.
  G03B 15/06 (2006.01)
  H04N 5/235 (2006.01)
  H04N 5/225 (2006.01)
  H04N 5/232 (2006.01)

(52) U.S. Cl.
  CPC .......... *H04N 5/2354* (2013.01); *H04N 5/2256* (2013.01); *H04N 5/23216* (2013.01); *H04N 5/23245* (2013.01)

(58) Field of Classification Search
  USPC ........ 396/155, 175–177, 162; 362/3, 15, 18; 348/370, 371
  See application file for complete search history.

(56) References Cited

U.S. PATENT DOCUMENTS

| | | | |
|---|---|---|---|
| 5,345,284 A | 9/1994 | Tsuruta | |
| 5,486,886 A * | 1/1996 | Vaynshteyn | G03B 15/05 362/18 |
| 5,666,564 A * | 9/1997 | Albrecht | G02B 3/0056 396/175 |
| 5,708,867 A | 1/1998 | Nagata et al. | |
| 5,911,085 A * | 6/1999 | Fuke | G03B 15/05 362/18 |
| 6,606,458 B2 | 8/2003 | Umeda et al. | |
| 7,046,926 B2 * | 5/2006 | Chikugawa | G03B 15/05 362/11 |
| 8,154,650 B2 | 4/2012 | Tsai | |
| 8,717,326 B2 | 5/2014 | Ciesla | |
| 2005/0174473 A1* | 8/2005 | Morgan | F21S 48/325 348/370 |
| 2013/0003342 A1 | 1/2013 | You | |
| 2014/0362229 A1* | 12/2014 | Jendbro | G03B 15/03 348/169 |

OTHER PUBLICATIONS

Anonymous "Apparatus to have an on Camera rail with Flash mount which can rotate & revolve (around camera body on rail) & can have multiple flashes attached to it", IP.com, Jun. 5, 2015, 3 pages.

(Continued)

*Primary Examiner* — Clayton E Laballe
*Assistant Examiner* — Warren K Fenwick
(74) *Attorney, Agent, or Firm* — Lisa J. Ulrich; Andrew D. Wright; Roberts Mlotkowski Safran Cole & Calderon, P.C.

(57) ABSTRACT

Systems and method for controlling camera flash direction are provided. A system includes: a computing device including a processor; an image sensor operatively connected to the processor; a flash lighting system including at least one light emitting element; and a flash direction system including a fluidics system that is controllable to selectively adjust a position of the at least one light emitting element.

25 Claims, 7 Drawing Sheets

(56) References Cited

OTHER PUBLICATIONS

Hayes, Tim, "Next-Generation Cell Phone Cameras", http://www.osa-opn.org/home/articles/volume_23/issue_2/features/next-generation_cell_phone_cameras/#.VYp_Ux DJV0A, Optics & Photonics News, vol. 23, Date Accessed Jul. 27, 2015; pp. 1-7.
Kodak The Direction (position) of light, Kodak Moments, http://www.kodak.com/ek/US/en/Home_Main/Tips_Projects_Exchange/Learn/Photo_Tips_Techni ques/Advanced_Techniques/Direction_of_light.htm, Date accessed Jul. 27, 2015; 2 pages.
Tactus "Taking Touch Screen Interfaces Into a New Dimension", Tactus Technology, http://tactustechnology.com/wp-content/uploads/2013/09/Tactus_Technology_White_Paper.pdf, Date accessed Aug. 14, 2015; pp. 1-13.
Johnston, Casey "Microfluidics panel could add physical buttons to a touch screen", Gear & Gadgets/Product News & Reviews; http://arstechnica.com/gadgets/2014/01/new-microfluidics-panel-could-add-physical-buttons-to-a-touch-screen/, Jan. 23, 2014; 1 page.

\* cited by examiner

CAMERA FLASH LIGHT DIRECTION MANAGEMENT

BACKGROUND

The present invention generally relates to camera flashes, and more particularly, to a method and system of controlling a direction of light emitted by a camera flash.

A flash light source on a camera can have a very important role in the quality of a photograph for different light conditions. Improper flash lighting intensity and direction can detract or damage the quality of the photograph. In some systems, the user of the camera can manually change an aiming direction of the flash light by manually moving a pivotal portion of a flash attachment relative to the camera. These systems suffer from the problem of being manual (instead of automated) and having limited freedom of movement and limited directional rate of change.

In one arrangement for providing automated directional change of a camera flash light, a pair of cam follower claws provided on a flash projecting portion of a zoom flash are engaged with a helicoid cam surface of a flash angle changing cam such that the flash angle projecting portion moves in the direction of the rotational axes in response to rotation of the flash angle changing cam, thereby changing the projection angle of flash light. In another arrangement for providing automated directional change of a camera flash light, there is an integrated flash head having a ring flash for taking shadowless pictures and a bar flash for taking contoured pictures. The bar flash is pivotably mounted on the ring flash housing and the ring flash housing is movable relative to the camera lens to change the orientation of the bar relative to the camera lens. An electrical circuit is provided for selectively activating either the ring flash or bar flash. Both of these arrangements suffer from a problem of a limited amount of directional control of the flash light.

SUMMARY

In an aspect of the invention, there is a system including: a computing device including a processor; an image sensor operatively connected to the processor; a flash lighting system including at least one light emitting element; and a flash direction system including a fluidics system that is controllable to selectively adjust a position of the at least one light emitting element. The fluidics system may include: at least one cavity; a flexible membrane over the cavity; and a pressurization system that is configured to selectively increase and decrease a fluid pressure in the at least one cavity.

The at least one cavity may include an array of plural cavities, and each one of the plural cavities may be configured to be pressurized and depressurized independently of the other ones of the plural cavities.

The system may include a flash direction controller that automatically controls the flash direction system to aim the at least one light emitting element in a determined direction. The determined direction may be based on a manual input from a user. Alternatively, the determined direction may be automatically determined based on a focal subject of a picture being taken.

The at least one lighting element may include a plurality of lighting elements, and a flash direction controller may control the flash direction system to simultaneously adjust respective positions of plural ones of the plurality of lighting elements.

In another aspect of the invention, there is a camera device that includes: a lens; an image sensor; and a processor. The camera device also includes a flash system including: a flash direction controller; a flash lighting controller; a flash direction system including a fluidics system; and a flash lighting system including at least one light emitting element. The flash direction controller causes the flash direction system to adjust a direction of aim of the at least one light emitting element. The flash lighting controller controls the flash lighting system to control on and off state of the at least one light emitting element.

The fluidics system may include at least one cavity arranged behind the at least one light emitting element, wherein the at least one cavity is configured to be selectively pressurized and depressurized to adjust the direction of aim of the at least one light emitting element.

The camera device may be one of a smartphone, a tablet computer, and a laptop computer. Alternatively, the camera device may be a digital camera such as a digital single-lens reflex camera.

In another aspect of the invention there is a computer implemented method that includes: determining a desired direction of aim of flash light of a camera device including at least one light emitting element; and adjusting a position of the at least one light emitting element using a fluidics system to achieve the desired direction of aim. The method may include receiving an indication of manual control or automatic control from a user. When the indication is manual control, the determining the desired direction of aim includes receiving an indication of the desired direction of aim from the user. When the indication is automatic control, the determining the desired direction of aim includes automatically determining the desired direction of aim based on an automatically determined focal subject.

In another aspect of the invention there is a computer program product for aiming a camera flash. The computer program product includes a computer readable storage medium having program instructions embodied therewith. The program instructions are executable by a computer device to cause the computer device to: determine a desired direction of aim of flash light of a camera device; and adjust a position of at least one light emitting element using a fluidics system to achieve the desired direction of aim.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
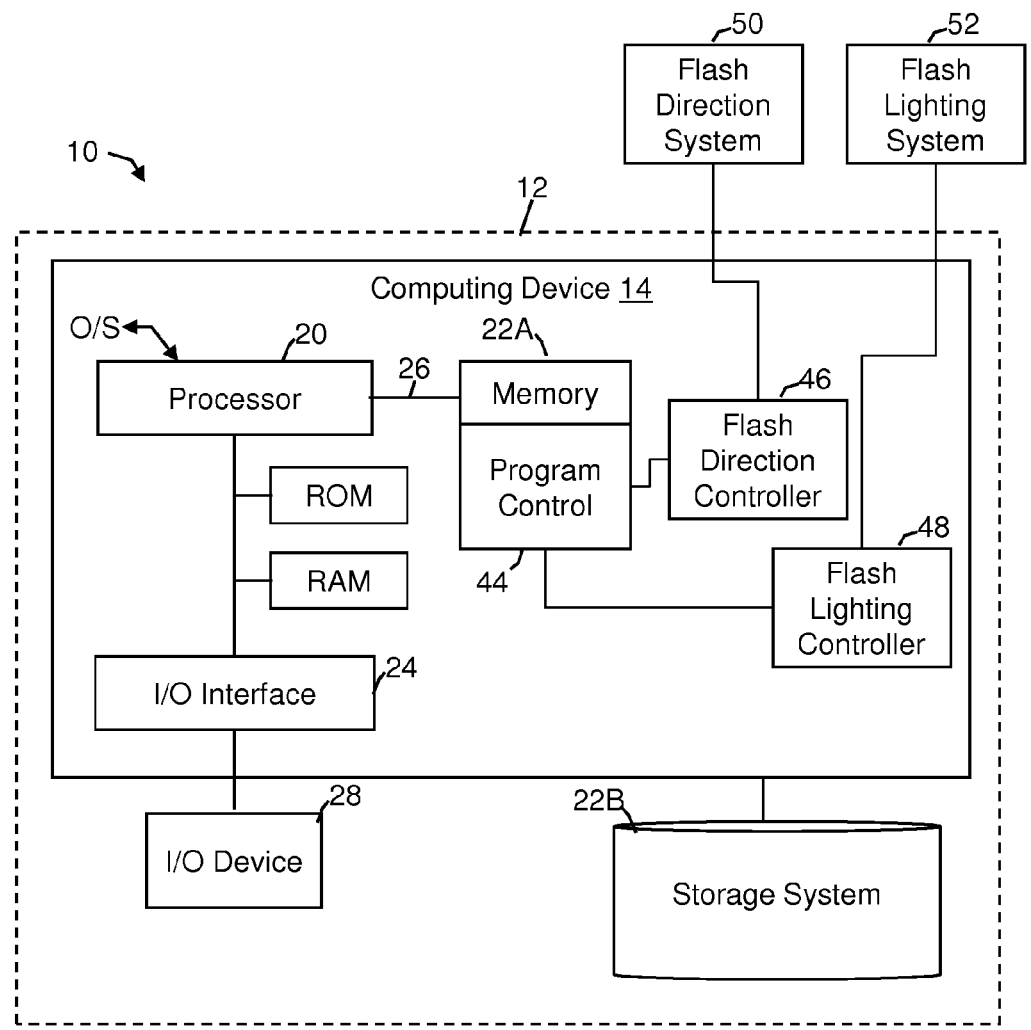
FIG. 1 is an illustrative environment for implementing the steps in accordance with aspects of the invention.

The present invention generally relates to camera flashes, and more particularly, to a method and system of controlling a direction of light emitted by a camera flash. In accordance with aspects of the invention, a light emitting element of a camera flash is arranged over a layer that is selectively deformable by a fluidics system. In embodiments, a controller adjusts an aiming direction of the light emitting element by selectively raising one or more portions of the deformable layer using the fluidics system. In this manner, the direction of the flash lighting can be moved nearly instantaneously and automatically in conjunction with the focal target of the camera. Implementations of the invention may also be used to simultaneously control respective aiming directions of plural different light emitting element of the camera flash. Aspects of the invention provide methods and systems by which a user can manage a light direction of a camera flash to improve picture quality.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a computing system 12 that can perform the processes described herein. In particular, system 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a touch screen, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a flash direction controller 46 and a flash lighting controller 48 that perform one or more of the processes described herein. The flash direction controller 46 and the flash lighting controller 48 can be implemented as one or more program code in program control 44 stored in memory 22A as separate or combined modules. Additionally, the flash direction controller 46 and the flash lighting controller 48 may be implemented as separate dedicated processors or a single or several processors to provide the function of these tools. While executing the computer program code, processor 20 can read and/or write data to/from memory 22A, storage system 22B, and/or I/O interface 24. The program code executes the processes of the invention. The bus 26 provides a communications link between each of the components in computing device 14.

The flash direction controller 46 and the flash lighting controller 48 are configured to control a flash direction system 50 and a flash lighting system 52, respectively. In embodiments, the flash direction controller 46 provides (e.g., transmits) direction control signals to the flash direction system 50, where the direction control signals cause the flash direction system 50 to adjust a direction of aim of at least one light emitting element of the flash lighting system 52. In embodiments, the flash lighting controller 48 provides (e.g., transmits) lighting control signals to the flash lighting system 52, where the lighting control signals cause the flash lighting system 52 to control on and off state of the at least one light emitting element. The flash direction controller 46, flash lighting controller 48, flash direction system 50, and flash lighting system 52 can be used, for example, to provide a camera flash that can be aimed in a desired direction.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, system 12 is only illustrative of various types of computer infrastructures for implementing the invention. For example, in embodiments, system 12 comprises two or more computing devices (e.g., a server cluster) that communicate over any type of communications link, such as a network, a shared memory, or the like, to perform the process described herein. Further, while performing the processes described herein, one or more computing devices on system 12 can communicate with one or more other computing devices external to system 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
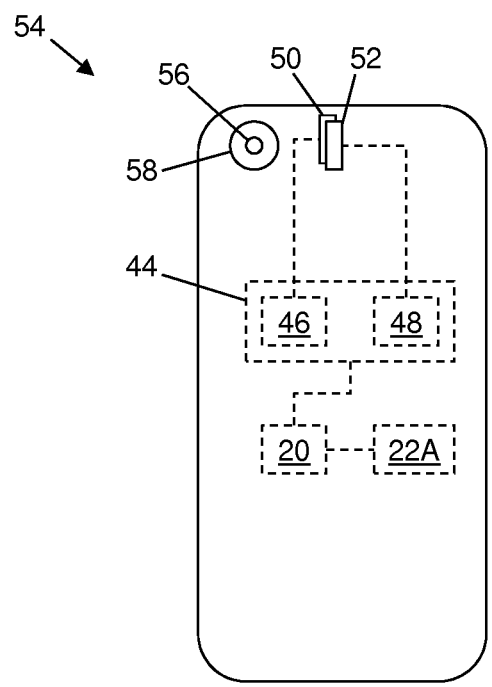
FIG. 2 shows a mobile computing device implementation in accordance with aspects of the invention.

FIG. 2 shows an embodiment in which the computing device (e.g., computing device 14 of FIG. 1) is implemented as a mobile computer device 54, such as a smartphone, tablet computer, laptop computer, or similar device. For example, as shown in FIG. 2, the mobile computing device 54 (e.g., a smartphone) may include a processor 20, memory 22A, program control 44, flash direction controller 46, flash lighting controller 48, flash direction system 50, and flash lighting system 52, e.g., as described with respect to FIG. 1. The mobile computing device 54 may also include an image sensor 56 (e.g., a complementary metal-oxide-semiconductor (CMOS) image sensor) and a lens 58. The mobile computing device 54 may also include a display such as an LCD touch screen. The mobile computing device 54 may provide conventional smartphone camera functionality by capturing an image with the image sensor 56, optionally performing digital processing of the captured image via the processor 20, storing data defining the image in memory 22A, and displaying the image on the display.

Figure 3:
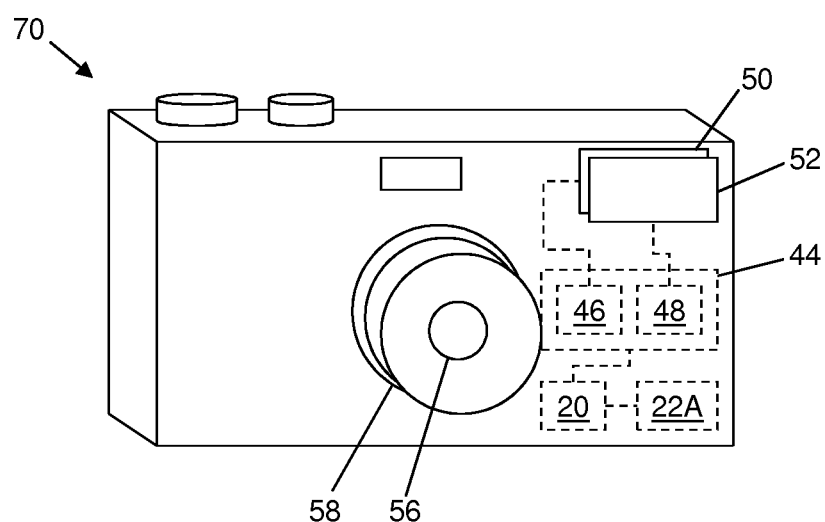
FIG. 3 shows a camera implementation in accordance with aspects of the invention.

FIG. 3 shows an alternative embodiment in which the computing device (e.g., computing device 14 of FIG. 1) is implemented in a camera 70, such as a digital camera, more specifically a digital point-and-shoot camera or a digital single-lens reflex camera (also called a digital SLR or DSLR). For example, as shown in FIG. 3, the camera 70 may include a processor 20, memory 22A, program control 44, flash direction controller 46, flash lighting controller 48, flash direction system 50, and flash lighting system 52, e.g., as described with respect to FIG. 1. The camera 70 may also include an image sensor 56 (e.g., a complementary metal-oxide-semiconductor (CMOS) image sensor) and a lens 58. The camera 70 may also include a display such as an LCD touch screen. The camera 70 may provide conventional digital camera functionality by collecting light through the lens 58, capturing an image with the image sensor 56, optionally performing digital processing of the captured image via the processor 20, storing data defining the image in memory 22A, and displaying the image on the display.

Figure 4:
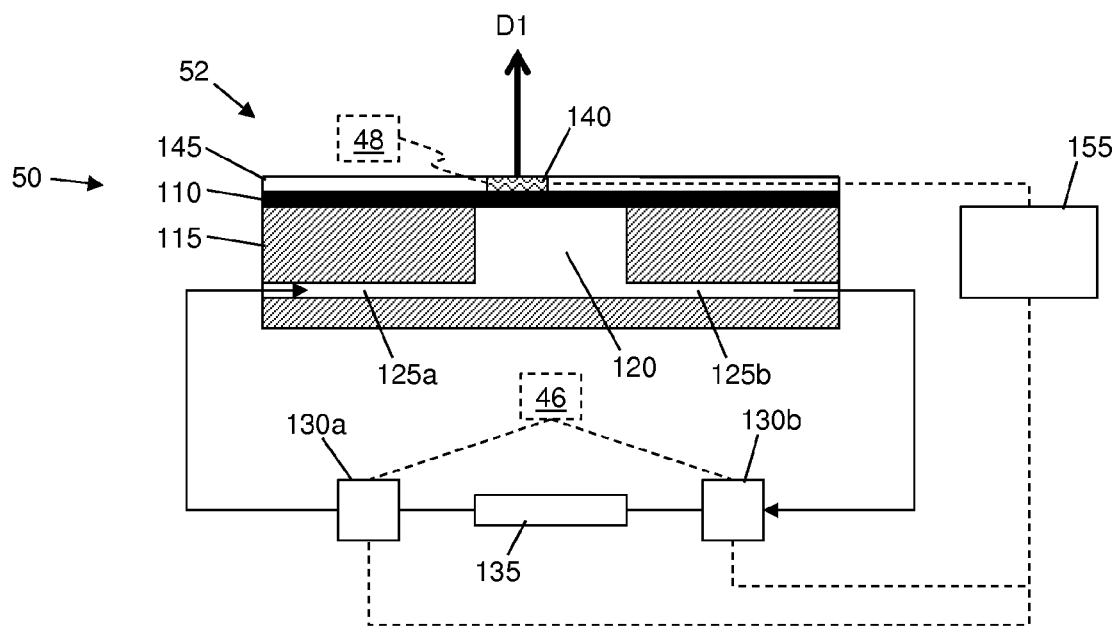
FIGS. 4 and 5 show aspects of a flash direction system and a flash lighting system in accordance with aspects of the invention.

FIG. 4 shows a cross section view of a portion of the flash direction system 50 and flash lighting system 52 that can be used in either the mobile computing device 54 of FIG. 2 or the camera 70 of FIG. 3 in accordance with aspects of the invention. In embodiments, the flash direction system 50 includes a deformable membrane 110 attached to a substrate 115. In aspects, the substrate 115 includes a cavity 120, a first fluid passageway 125a fluidically connecting the cavity 120 to a pressurization system and a second fluid passageway 125b fluidically connecting the cavity to the pressurization system. In embodiments, the pressurization system includes a first pump 130a connected to the first fluid passageway 125a and a second pump 130b connected to the second fluid passageway 125b. The pressurization system may include a fluid reservoir 135 that is fluidically connected between the first pump 130a and the second pump 130b. The fluid reservoir 135 may be formed within the substrate 115 or alternatively outside of the substrate 115 (e.g., within a body of the mobile computing device 54 or camera 70). Other fluid pressurization systems may be used, including ones having different numbers of pumps, more or less passages, and valves for controlling flow of fluid within passages.

Figure 5:
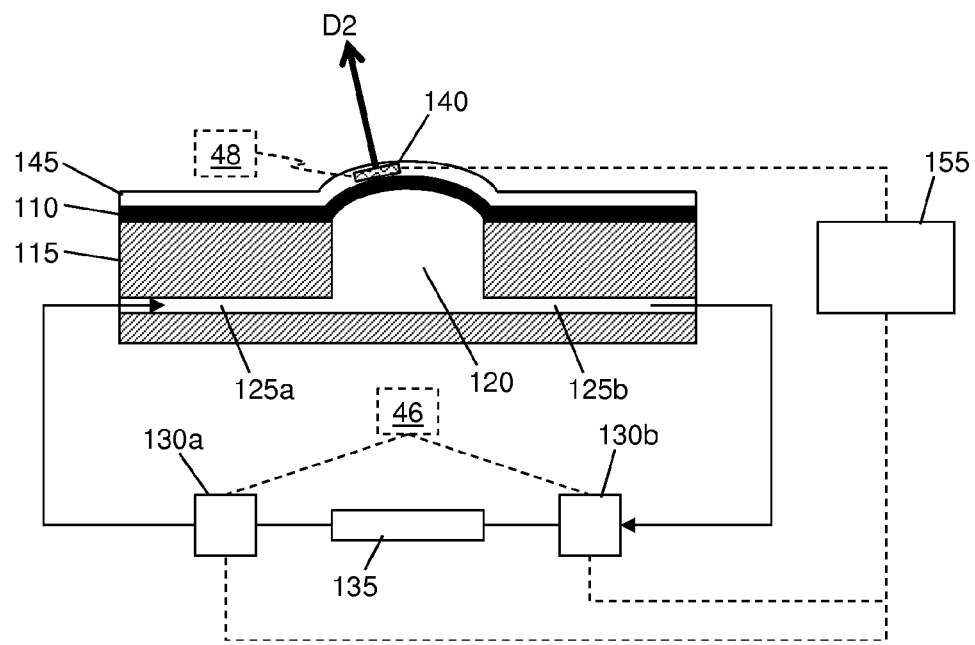

The cavity 120, passageways 125a, 125b and pumps 130a, 130b are part of a fluidics system that can be used to deform the membrane 110 by pressurizing and de-pressurizing the cavity 120 as described in greater detail herein with respect to FIG. 5. The pumps 130a, 130b may be connected to a power source 155 (e.g., a battery) and may be controlled (e.g., selectively turned on and off) by the flash direction controller 46. The membrane 110, substrate 115, pumps 130a, 130b, and fluid contained in the system may be implemented using conventional fluidics system materials. For example, the substrate 115 may be made from polymers or glass, for example, elastomers, silicon-based organic polymers such as poly-dimethylsiloxane (PDMS), thermoset plastics such as polymethyl methacrylate (PMMA), and photocurable solvent resistant elastomers such as perfluropolyethers. The membrane 110 may be made from elastic material including polymers or silicon-based elastomers such as poly-dimethylsiloxane (PDMS) or polyethylene terephthalate (PET). The fluid inside the cavity 120 and the optional fluid reservoir 135 may be any suitable fluid such as air, water, alcohol based fluid, or oil based fluid. The fluidics system may be a macrofluidics system, a microfluidics system, a nanofluidics system, or a hybrid of one or more of a macro, micro, or nano system. In a preferred embodiment, the fluidics system is a microfluidics system in which the cavity 120 has a diameter of about 200 nm, although other diameters may be used.

Still referring to FIG. 4, the flash lighting system 52 includes a light emitting element 140 arranged over the membrane 110. In embodiments, the light emitting element 140 comprises a light emitting diode (LED) formed on or in a flexible layer 145, which may be formed directly on or spaced apart from the membrane 110. The light emitting element 140 is electrically connected to the electrical power source 155 and is controlled (e.g., selectively turned on and off) by the flash lighting controller 48. In this manner, the flash lighting controller 48 is configured to selectively turn the light emitting element 140 on and off for the purpose of providing flash light for the mobile computing device 54 or camera 70.

As shown in FIG. 4, the light emitting element 140 emits light primarily in a first direction D1 relative to the substrate 115 when the membrane 110 is flat across the cavity 120, e.g., when the cavity 120 is not pressurized by the. As shown in FIG. 5, when it is desired to change the aiming direction of the light emitting element 140, the fluid pressure inside the cavity 120 is increased to cause the membrane 110 to extend outward from the cavity 120. Extending the membrane 110 outward from the cavity 120 deflects the light emitting element 140 such that the light emitting element 140 emits light primarily in a second direction D2 relative to the substrate 115, the second direction D2 being at an angle relative to the first direction D1. In embodiments, the fluid pressure inside the cavity 120 is increased by the flash direction controller 46 activating the first pump 130a and deactivating the second pump 130b. When it is desired to change the direction of the light emitting element 140 back to the first direction D1, the fluid pressure inside the cavity 120 is decreased by the flash direction controller 46 deactivating the first pump 130a and activating the second pump 130b until the membrane 110 is flat (as shown in FIG. 4). In this manner, the direction of the light emitting from the light emitting element 140, and thus the direction of the flash light of the camera, can be altered using the fluidics system.

Figure 6A:
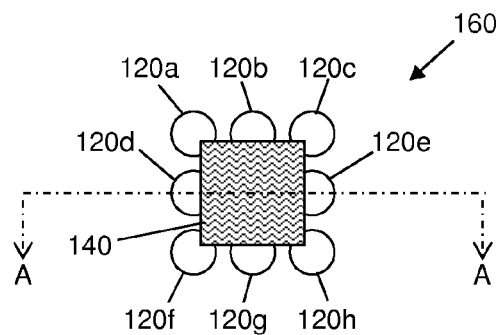
FIGS. 6A-D show aspects of a flash direction system and a flash lighting system in accordance with aspects of the invention.

FIG. 6A shows a plan view of an array 160 of cavities 120a-h formed in the substrate 115 relative to a light emitting element 140 in accordance with aspects of the invention. The membrane 110, substrate 115, and flexible layer 145 are omitted from view in FIG. 6A for clarity, but may be present in implementations. Each of the cavities 120a-h may be selectively pressurized and depressurized independent of the other cavities 120a-h using an appropriate arrangement of passageways and pumps and under the control of the flash direction controller 46, e.g., in a manner similar to that described with respect to FIGS. 4 and 5.

Figure 6B:
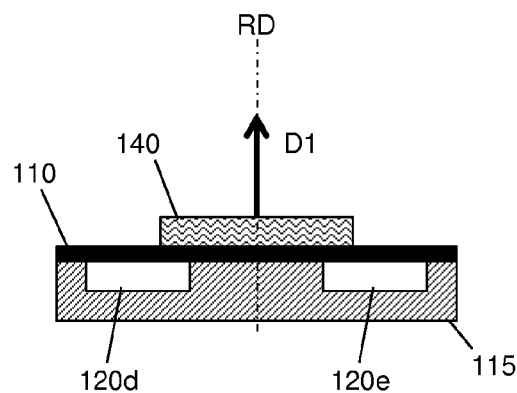

FIG. 6B shows a cross section view along line A-A of FIG. 6A when none of the cavities 120a-h is pressurized. As shown in FIG. 6B, the membrane 110 is not deflected above any of the cavities, such that the light emitting element 140 is aimed in direction D1 that is substantially parallel to a reference direction RD that is perpendicular to the planar upper surface of the substrate 115.

Figure 6C:
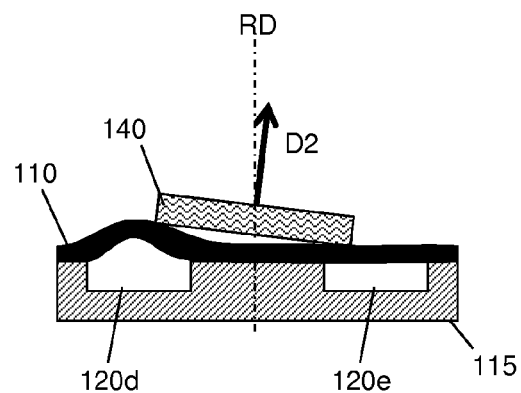

FIG. 6C shows a cross section view along line A-A of FIG. 6A when cavity 120d is pressurized and cavities 120a-c and 120e-h are not pressurized. As shown in FIG. 6C, the membrane 110 is deflected above pressurized cavity 120d, such that the light emitting element 140 is deflected and aimed in direction D2 that is angled in a first direction relative to the reference direction RD.

Figure 6D:
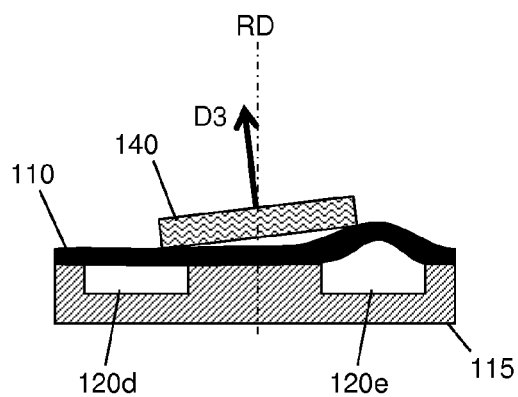

FIG. 6D shows a cross section view along line A-A of FIG. 6A when cavity 120e is pressurized and cavities 120a-d and 120f-h are not pressurized. As shown in FIG. 6D, the membrane 110 is deflected above pressurized cavity 120e, such that the light emitting element 140 is deflected and aimed in direction D3 that is angled in a second direction relative to the reference direction RD.

Although not shown, each one of the eight cavities 120*a*-*h* may be individually pressurized to create eight different deflected directions for light emitting element 140 (in addition to the non-deflected direction of the light emitting element 140 when none of the cavities 120*a*-*h* is pressurized). Moreover, plural ones of the cavities 120*a*-*h* may be simultaneously pressurized to provide additional different directions of aiming the light emitting element 140. For example, cavities 120*a* and 120*d* may be pressurized to cause deflection of the membrane 110 over these two cavities, while the other cavities are not pressurized. Furthermore, more than eight cavities may be used with a single light emitting element 140, to provide even more granularity and thus more directions for aiming the light emitting element 140. Any number of cavities may be spatially arranged in any desired pattern relative to the light emitting element to provide a desired group of directions forming aiming the light emitting element.

Figure 7:
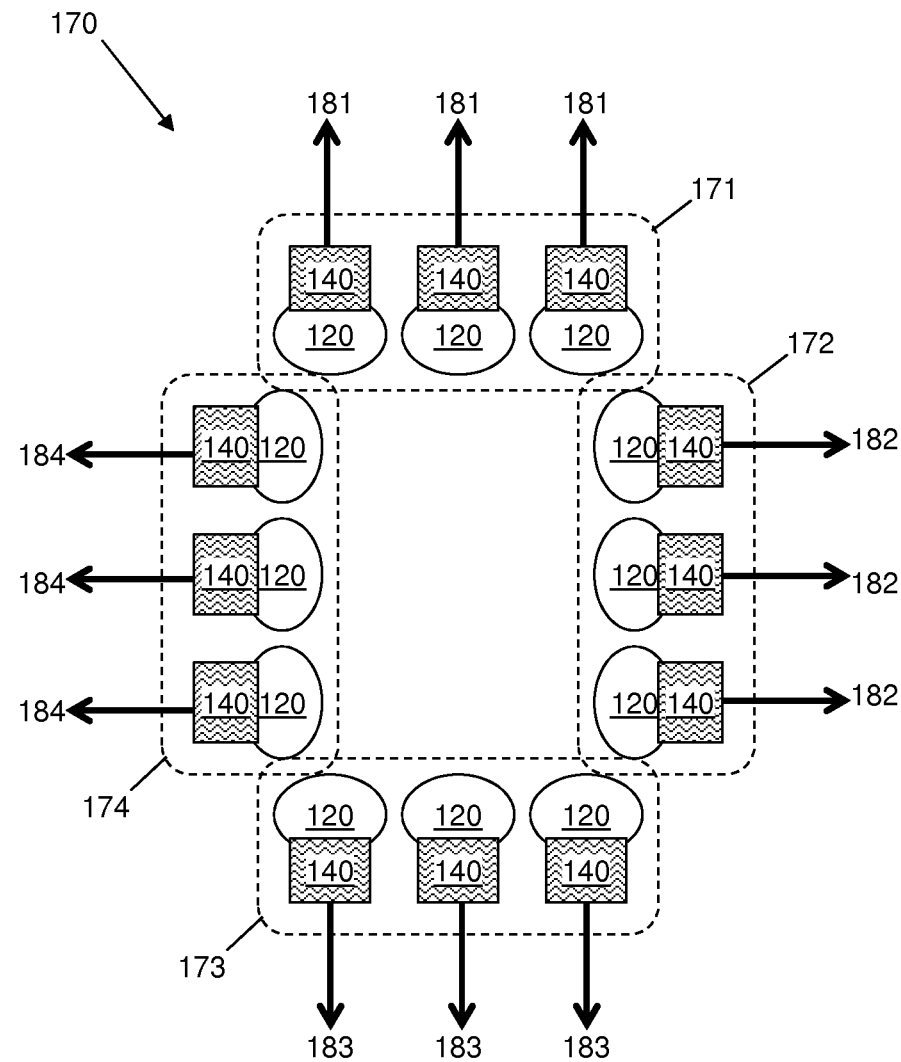
FIGS. 7 and 8 show exemplary arrays included in a flash direction system and a flash lighting system in accordance with aspects of the invention.

FIG. 7 shows a plan view of an array 170 of plural light emitting elements 140 each associated with a respective single cavity 120 in a manner similar to that shown in FIGS. 4 and 5. The membrane 110, substrate 115, and flexible layer 145 are omitted from view in FIG. 7 for clarity, but may be present in implementations. All the light emitting elements 140 in the array 170 can be aimed in a common direction corresponding to when the membrane is flat over the cavities, e.g., in the manner shown in FIG. 4. Different subsets of the light emitting elements 140 may be configured to be aimed in different deflected directions by pressurizing the cavities associated with the cavities in the respective subsets. For example, a first subset 171 of light emitting elements 140 of the array 170 are arranged to be aimed in a first direction 181, a second subset 172 of light emitting elements 140 of the array 170 are arranged to be aimed in a second direction 182, a third subset 173 of light emitting elements 140 of the array 170 are arranged to be aimed in a third direction 183, and a fourth subset 174 of light emitting elements 140 of the array 170 are arranged to be aimed in a fourth direction 184. Each subset 171-174 may include one or more light emitting elements 140.

In embodiments, a coordinate mapping of each light emitting element 140 to its corresponding cavity 120 is saved in memory (e.g., memory 22A), as well as a data structure that defines the light emitting elements 140 and cavities 120 that are in each subset 171-174. In this manner, the flash direction controller 46 and the flash lighting controller 48 may use the mapping and subset definition to selectively pressurize certain cavities 120 and selectively turn on certain light emitting elements 140 to achieve a desired camera flash direction.

With continued reference to FIG. 7, the array 170 may be used to provide a camera flash that can be aimed in plural different directions at different times using the different subsets 171-174. For example, the flash direction controller 46 may pressurize the cavities associated with the first subset 171, while not pressurizing the cavities associated with subsets 172, 173, 174. In this arrangement, the light emitting elements 140 of the first subset 171 are aimed in the direction 181, while the light emitting elements 140 of the other subsets 172, 173, 174 are all pointed in the common, straight ahead direction. With the light emitting elements 140 arranged in this manner, the flash lighting controller 48 may turn on the light emitting elements 140 of the first subset 171 without turning on the light emitting elements 140 of the other subsets 172, 173, 174. In this manner, a camera flash is provided in the first direction 181. This may be useful, for example, when it is desired to provide the flash lighting to one side of an object in the focus of the picture being taken.

Figure 8:
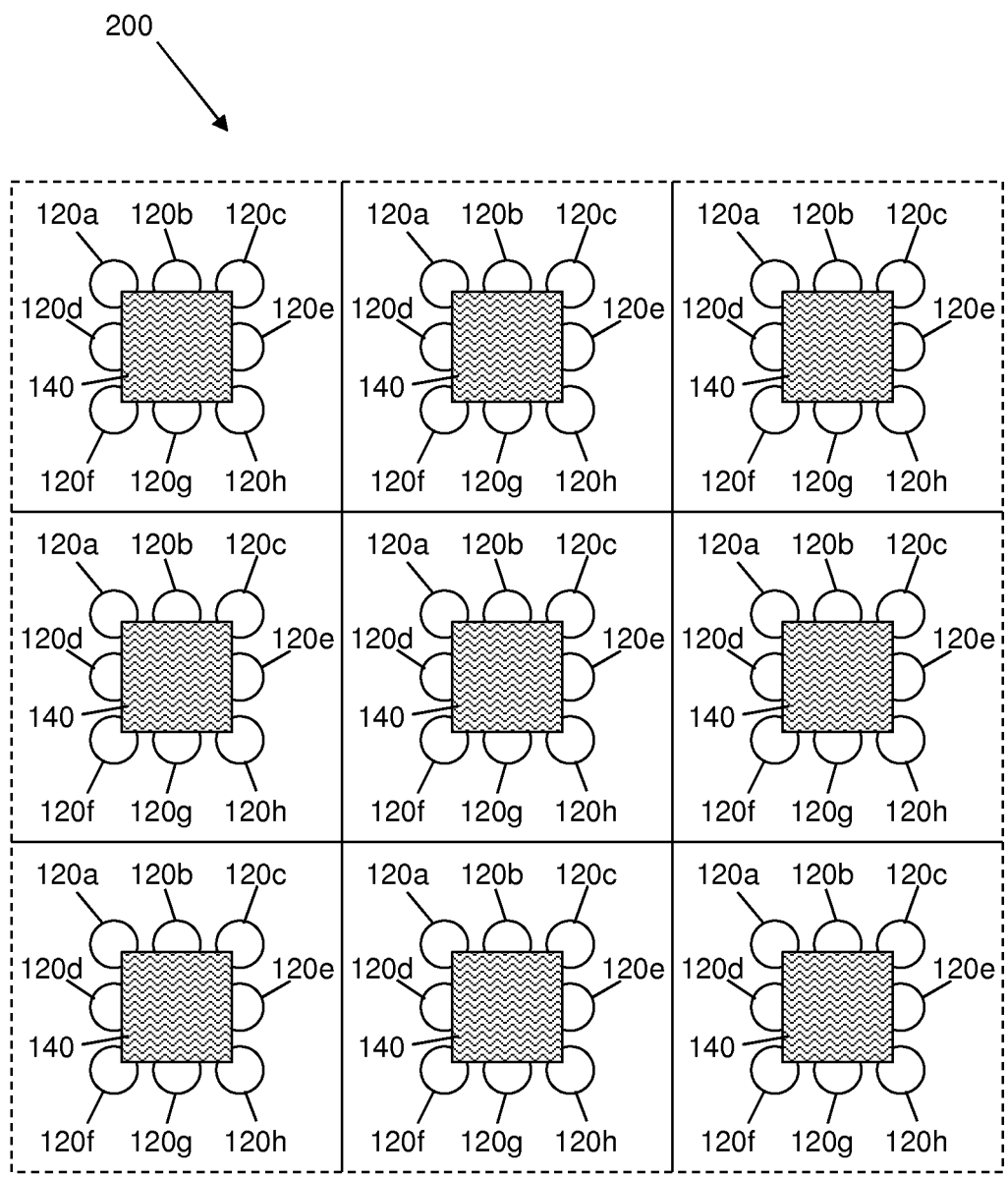

FIG. 8 shows a plan view of an array 200 of plural light emitting elements 140 each associated with a respective array of cavities 120*a*-*h* in a manner similar to that shown in FIG. 6A. The membrane 110, substrate 115, and flexible layer 145 are omitted from view in FIG. 7 for clarity, but may be present in implementations. The direction of each of the light emitting elements 140 of the array 200 may be independently controlled by the flash direction controller 46 independent of the other light emitting elements 140 of the array 200. Moreover, the on and off state of each of the light emitting elements 140 of the array 200 may be independently controlled by the flash lighting controller 48 independent of the other light emitting elements 140 of the array 200. The system may be configured such that the flash direction controller 46 and the flash lighting controller 48 simultaneously control plural different cavities 120*a*-*h* and light emitting elements 140 in selected states. In embodiments, a coordinate mapping of each light emitting element 140 to its corresponding array 160 of cavities 120*a*-*h* is saved in memory (e.g., memory 22A). In this manner, the flash direction controller 46 and the flash lighting controller 48 may use the mapping to selectively pressurize certain cavities 120*a*-*h* of certain arrays 160 and selectively turn on certain light emitting elements 140 to achieve virtually any desired camera flash direction.

The directional flash lighting systems described with respect to FIGS. 4-8 may be integrated into the structure of the mobile computing device 54 (FIG. 2) or the camera 70 (FIG. 3). For example, the physical components of the flash direction system 50 and the flash lighting system 52 may be built into the structure of the mobile computing device 54 or the camera 70. Alternatively, the physical components of the flash direction system 50 and the flash lighting system 52 may be built into a structure that is removably attachable to the mobile computing device 54 or the camera 70 and that receives control signals from the flash direction controller 46 and the flash lighting controller 48.

The directional flash lighting systems described with respect to FIGS. 4-8 may be used with the mobile computing device 54 (FIG. 2) or camera 70 (FIG. 3) in at least one of a manual mode and an automatic mode. In a manual mode, the user may manually set the direction of the flash. For example, the mobile computing device 54 or camera 70 may display a graphic user interface (GUI) on a video display of the device, and the GUI may permit the user to select a predefined direction for the flash (e.g., straight, left, right, up, down). In this manner, the user manually sets the direction of the flash prior to taking a picture with the flash. Accordingly, when a picture is taken in manual mode, the appropriate cavities (e.g., 120) are pressurized and the appropriate light emitting elements (e.g., 140) are turned on to achieve the flash direction that is manually chosen by the user.

Alternatively, in an automated mode the mobile computing device 54 or camera 70 may be configured to automatically determine a direction of the flash, and to control the appropriate cavities (e.g., 120) and the appropriate light emitting elements (e.g., 140) to achieve the automatically determined flash direction. For example, the directional flash lighting systems described herein may be configured to aim the flash lighting at the focal subject of the picture that is being taken. Many autofocus camera devices (both DSLR and smartphones) use a sensor and algorithms to determine a focal subject of a picture that is being taken. Some autofocus camera devices are able to detect whether the focal subject is moving towards or away from the camera, including speed and acceleration data, and keep focus on the focal subject.

In embodiments, when in the automated mode, the mobile computing device 54 or camera 70 is configured to automatically determine the focal subject of the picture that is being taken using conventional techniques, and to pressurize the appropriate cavities (e.g., 120) and turn on the appropriate light emitting elements (e.g., 140) to aim the flash light at the determined focal subject of the picture. In further embodiments, the mobile computing device 54 or camera 70 is configured to automatically determine that the focal subject of the picture is moving, and to pressurize the appropriate cavities (e.g., 120) and turn on the appropriate light emitting elements (e.g., 140) to change the direction of the aim of the flash light to follow the movement of the focal subject in real time. In this manner, implementations of the invention provide a system that can rapidly change the aiming direction of the flash based on a determined location of a moving focal subject when capturing a sequence of photos or a video.

In embodiments, in the automated mode the mobile computing device 54 or camera 70 may be configured to automatically determine a direction of the flash based on a detected reflection in the picture being taken. Conventional techniques may be used to automatically detect the presence of a reflection in a picture being taken. Based on the detected reflection, the mobile computing device 54 or camera 70 may be configured to automatically pressurize the appropriate cavities (e.g., 120) and turn on the appropriate light emitting elements (e.g., 140) to aim the flash lights in one or more directions that reduce or eliminate the detected reflection. This may include, for example, aiming plural ones of the light emitting elements (e.g., 140) to converge on a focal area in the picture being taken.

In embodiments, in the automated mode the mobile computing device 54 or camera 70 may be configured to automatically determine a direction of the flash based on a detected glare in the picture being taken. Conventional techniques may be used to automatically detect the presence of a glare in a picture being taken. Based on the detected glare, the mobile computing device 54 or camera 70 may be configured to automatically pressurize the appropriate cavities (e.g., 120) and turn on the appropriate light emitting elements (e.g., 140) to aim the flash lights in one or more directions that reduce or eliminate the detected glare. This may include, for example, turning on more or less of the light emitting elements (e.g., 140) in a particular direction to reduce the glare.

Figure 9:
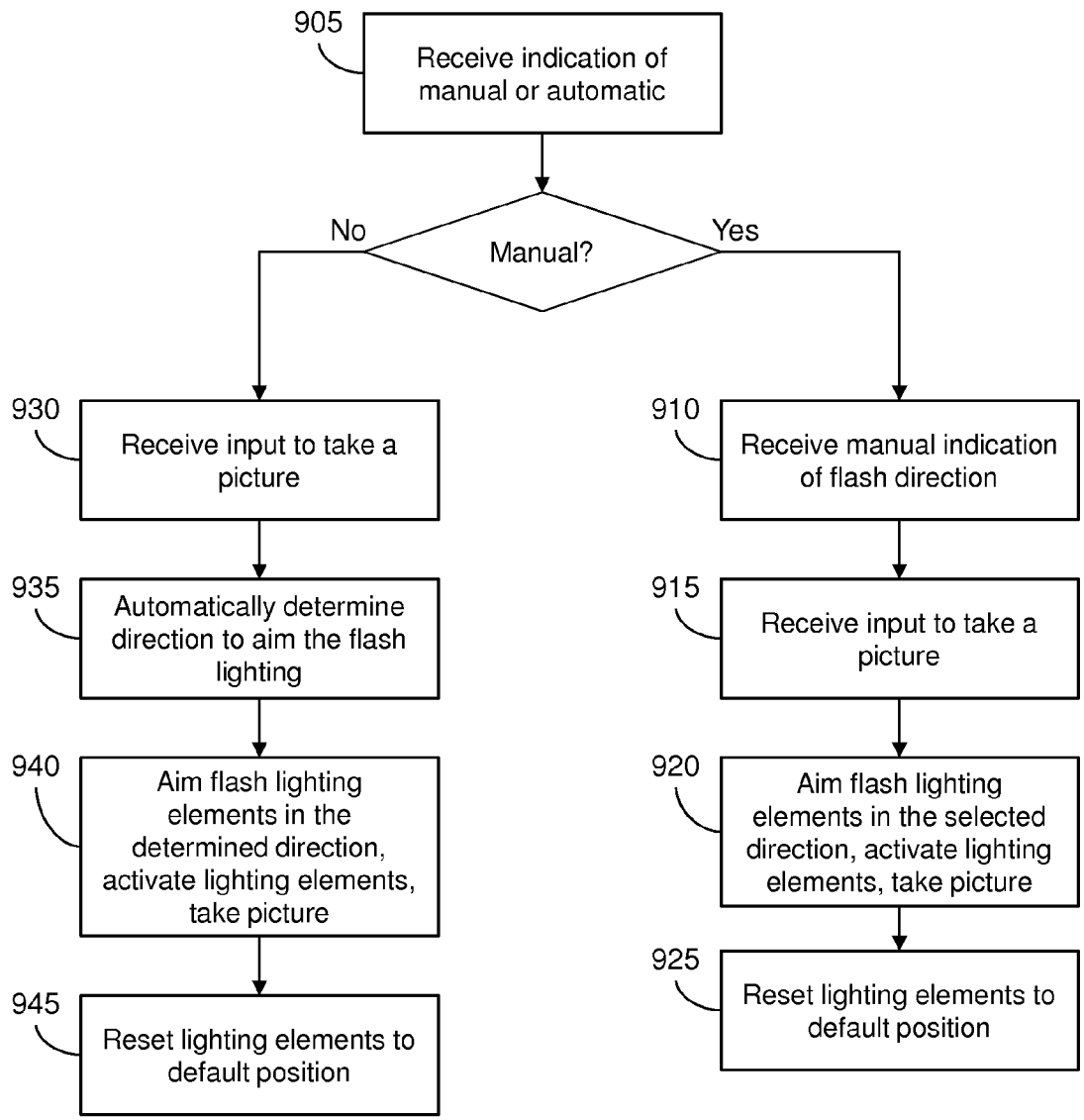
FIG. 9 shows a flowchart of steps of an exemplary method for performing aspects of the invention.

FIG. 9 shows a flowchart of steps of an exemplary method for performing aspects of the present invention. The steps of FIG. 9 may be implemented in the environment of any of FIGS. 1-3, for example, using one or more of the directional flash lighting systems described with respect to FIGS. 4-8. As noted above, the flowchart(s) illustrate the architecture, functionality, and operation of possible implementations of systems, methods, and computer program products according to various embodiments of the present invention.

At step 905, a system (e.g., computing device 14, which may be mobile computing device 54 or camera 70 or some other computing device) receives an indication of manual or automatic control of flash direction. In embodiments, the system displays a GUI and receives the indication of manual or automatic control from a user via the GUI.

In the event the user indicated manual control at step 905, then at step 910 the system receives a manual indication of the direction of the flash. In embodiments, the system displays a GUI and receives the indication of the direction of the flash (e.g., straight, left, right, up, down) from a user via the GUI.

At step 915, the system receives an input to take a picture. Step 915 may be performed in a conventional manner, e.g., a user pressing a physical button or a virtual button on either the mobile computing device 54 or camera 70.

At step 920, the system aims the flash light in the direction that was selected at step 910, activates one or more of the light emitting elements, and takes a picture. In embodiments, the flash direction controller 46 pressurizes one or more cavities 120 (or 120*a-h*) and the flash lighting controller 48 turns on one or more light emitting elements 140 based on a mapping of the cavities and light emitting elements to achieve the manually selected flash direction when the picture is taken. After taking the picture, the system may display the picture on a display screen of the device and may save the picture in memory in a conventional manner.

At step 925, after taking the picture, the system optionally depressurizes certain ones of the cavities. In embodiments, the cavities that were pressurized in step 920 may be depressurized to set all the light emitting elements to a default position.

In the event the user indicated automatic control at step 905, then at step 930 the system receives an input to take a picture. Step 930 may be performed in a conventional manner, e.g., a user pressing a physical button or a virtual button on either the mobile computing device 54 or camera 70.

At step 935, the system automatically determines a direction to aim the flash light. In embodiments, the system uses conventional techniques to automatically determine the focal subject of the picture that is being taken, and determines the direction to aim the flash light to match the location of the focal subject.

At step 940, the system aims the flash light in the direction that was determined at step 935, activates one or more of the light emitting elements, and takes a picture. In embodiments, the flash direction controller 46 pressurizes one or more cavities 120 (or 120*a-h*) and the flash lighting controller 48 turns on one or more light emitting elements 140, based on a mapping of the cavities and light emitting elements, to aim the flash lighting in the direction determined at step 935, e.g., to aim the flash light at the determined focal subject of the picture. Step 940 may include simultaneously controlling plural different cavities 120 (or 120*a-h*) and light emitting elements 140. After taking the picture, the system may display the picture on a display screen of the device and may save the picture in memory in a conventional manner.

At step 945, after taking the picture, the system optionally depressurizes certain ones of the cavities. In embodiments, the cavities that were pressurized in step 920 may be depressurized to set all the light emitting elements to a default position.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a computing device comprising a processor;
   an image sensor operatively connected to the processor;
   a flash lighting system comprising at least one light emitting element;
   a flash direction system comprising a fluidics system that is controllable to selectively adjust a position of the at least one light emitting element.

2. The system of claim 1, wherein the fluidics system comprises:
   at least one cavity;
   a flexible membrane over the cavity; and
   a pressurization system that is configured to selectively increase and decrease a fluid pressure in the at least one cavity.

3. The system of claim 2, wherein the at least one light emitting element is over the cavity.

4. The system of claim 3, wherein increasing the fluid pressure in the at least one cavity deforms the flexible membrane over the cavity and moves the at least one light emitting element.

5. The system of claim 3, wherein:
   the at least one light emitting element is aimed in a first direction when the at least one cavity is at a first pressure; and
   the at least one light emitting element is aimed in a second direction different than the first direction when the at least one cavity at a second pressure different than the first pressure.

6. The system of claim 2, wherein:
   the at least one cavity comprises an array of plural cavities;
   each one of the plural cavities is configured to be pressurized and depressurized independently of the other ones of the plural cavities.

7. The system of claim 1, further comprising a flash direction controller that automatically controls the flash direction system to aim the at least one light emitting element in a determined direction.

8. The system of claim 7, wherein the determined direction is based on a manual input from a user.

9. The system of claim 7, wherein the determined direction is automatically determined based on a focal subject of a picture being taken.

10. The system of claim 1, wherein:
    the at least one lighting element comprises a plurality of lighting elements; and
    a flash direction controller controls the flash direction system to simultaneously adjust respective positions of plural ones of the plurality of lighting elements.

11. The system of claim 1, wherein the computing device comprises a mobile computing device.

12. The system of claim 11, wherein the mobile computing device comprises one of a smartphone, a tablet computer, and a laptop computer.

13. The system of claim 1, wherein the computing device comprises a digital camera.

14. The system of claim 13, wherein the digital camera comprises a digital single-lens reflex camera.

15. A camera device, comprising:
    a lens;
    an image sensor;
    a processor; and
    a flash system comprising a flash direction controller, a flash lighting controller, a flash direction system comprising a fluidics system, and a flash lighting system comprising at least one light emitting element;
    wherein the flash direction controller causes the flash direction system to adjust a direction of aim of the at least one light emitting element; and
    the flash lighting controller controls the flash lighting system to control on and off state of the at least one light emitting element.

16. The camera device of claim 15, wherein:
    the fluidics system comprises at least one cavity arranged behind the at least one light emitting element; and
    the at least one cavity is configured to be selectively pressurized and depressurized to adjust the direction of aim of the at least one light emitting element.

17. The camera device of claim 16, wherein:
    the at least one light emitting element is a single light emitting element;
    the at least one cavity is a plurality of cavities; and
    each one of the plurality of cavities is independently controllable to adjust the direction of aim of the single light emitting element.

18. The camera device of claim 16, wherein:
    the at least one light emitting element comprises an array of plural light emitting elements;
    the at least one cavity comprises an array of plural cavities;
    the flash direction controller uses a mapping of the plural light emitting elements relative to the plural cavities to determine a subset of the plural cavities to pressurize.

19. The camera device of claim 18, wherein the camera device comprises one of a smartphone, a tablet computer, a laptop computer, and a digital single-lens reflex camera.

20. A computer implemented method, comprising:
    determining a desired direction of aim of flash light of a camera device comprising at least one light emitting element; and
    adjusting a position of the at least one light emitting element using a fluidics system to achieve the desired direction of aim.

21. The method of claim 20, further comprising receiving an indication of manual control or automatic control from a user, wherein:
    when the indication is manual control, the determining the desired direction of aim comprises receiving an indication of the desired direction of aim from the user; and
    when the indication is automatic control, the determining the desired direction of aim comprises automatically determining the desired direction of aim based on an automatically determined focal subject.

22. The method of claim 20, wherein:
    the at least one light emitting element comprises a plurality of light emitting elements; and
    the adjusting comprises adjusting positions of ones of a subset of the plurality of light emitting elements that is less than the entire plurality of light emitting elements.

23. The method of claim 20, further comprising detecting that a focal subject is moving, wherein the adjusting comprises adjusting the position of at least one light emitting element to a first position and subsequently to a second position based on the detecting.

24. The method of claim 20, wherein the at least one light emitting element and the fluidics system are integrated within the camera device.

25. A computer program product for aiming a camera flash, the computer program product comprising a computer readable storage medium having program instructions embodied therewith, the program instructions being executable by a computer device to cause the computer device to:
- determine a desired direction of aim of flash light of a camera device; and
- adjust a position of at least one light emitting element using a fluidics system to achieve the desired direction of aim, wherein the at least one light emitting element and the fluidics system are integrated within the camera device.

* * * * *